INVENTOR.
PAUL S. PETERSEN

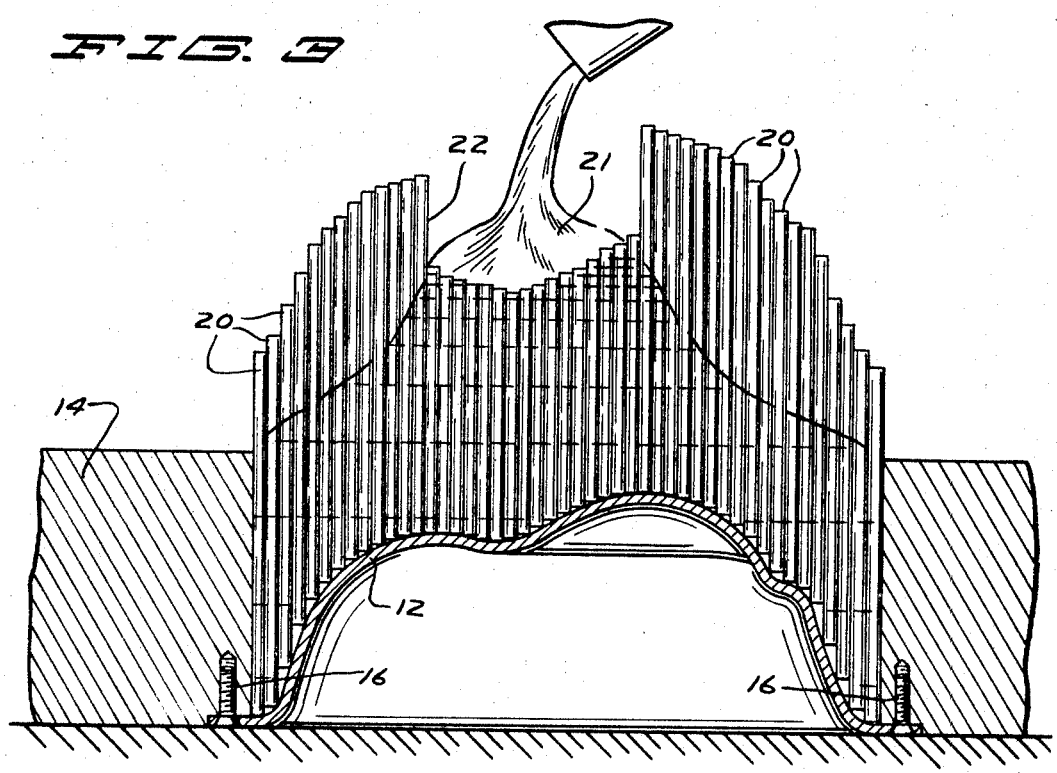
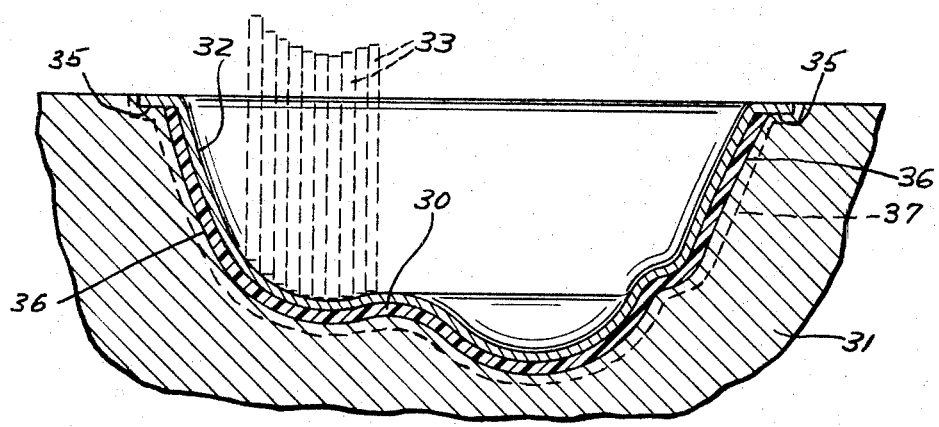

United States Patent Office 3,434,182
Patented Mar. 25, 1969

3,434,182
MOLD AND METHOD OF MAKING SAME
Paul S. Petersen, Minnetonka, Minn., assignor to Rosemount Engineering Company, Minneapolis, Minn., a corporation of Minnesota
Filed Oct. 21, 1966, Ser. No. 588,567
Int. Cl. B29c 17/00
U.S. Cl. 18—35                              9 Claims

ABSTRACT OF THE DISCLOSURE

A mold formed from a thin shell and having a backing of elongated rods oriented in the direction of molding pressure, and wherein the rods are permanently bonded to each other and to the mold shell to support the mold shell for molding.

---

The present invention has relation to molds and dies and more particularly to a mold or die which can be used for forming intricate shapes and can be constructed quickly, economically, accurately, and in a manner to withstand large stresses on the mold itself.

Background material

Ordinarily molds and dies, such as compression molds used for molding and forming of thermosetting plastics or fiberglass reinforced plastics are made from steel or high grade cast iron and are ordinarily tediously whittled from solid blocks of the material. The mold cavity is rough milled out and then finished by hand. This method is tedious, time consuming and highly expensive. Not only that, when a large block of steel is used, the process is time consuming because the cavity must be rough milled out and then the block has to be strain relieved and aged. After that, the cavity is again worked on until some of the contours are formed and then it is again aged or strain relieved and this process is repeated until the final configuration of the cavity is formed.

It is extremely expensive to do this and requires a long lead time. However, other methods that have been advanced to replace this standard procedure have not proved to be satisfactory. The old method is entirely reliable and a high quality of mold can always be obtained if skilled craftsmen perform the job.

It is ordinarily easier to build a model of the part rather than form the cavity which is a negative form of the part. Because of this, previous methods have been advanced wherein a model of the part is plated with a metal to a particular depth and then the plated layer or shell is removed and backed up in some manner to form a mold or die. Things that have been used as backing include epoxy resin or casting the backing from molten metal. Concrete and sintered metals have also been used for backings.

These methods all have drawbacks. First, the molds are subjected to a great deal of stress during use and distortion is a problem unless a very rigid backing is used. When a molten metal is poured to back the mold shell, there is a shrinkage problem caused when the metal cools and freezes. This will cause a distortion of the mold and in many cases there will be a void forming an unsupported area right underneath the mold face so that the mold is not able to function properly. Further, the cost of this is high because of the large volume of the molten metal required. Another problem is the difficulty of getting the molten metal or other backing to adhere to the plated metal. This in particular can cause unsupported areas under the shell.

The present invention

The present invention presents a mold or die and the method of making it which utilizes the principle of forming a layer onto a model of the part which is ultimately to be molded. This is normally done by electro-depositing nickel on the part. Of course, the model is sectioned along its desired parting line so that the mold is only formed up to the parting line. After the metal has been deposited on the model to a sufficient depth, the formed layer or shell is removed from the part and is placed into a large block of material that has a cavity of size to receive the shell. In the case of the cavity, the mold shell is fastened at its peripheral edges to the block and the mold face portions are backed by filling the opening or cavity in the solid block of material with elongated rods positioned so that ends of the rods abut directly against the mold shell. The rods are tightly packed into the opening of the solid block material to fill up as much space as possible. Then a suitable solder material is poured into the rods to take up the interstitial spaces between the rods and form a continuous, solid backing for the mold face. Preferably, it is cooled more rapidly on the working surface of the mold to preclude voids due to shrinkage of the solder.

After this, the block is milled smooth on the side opposite from the opening or cavity of the mold and the unit is then ready to be placed into a conventional press and used.

The plunger is backed in substantially the same manner except the plunger must be made to go into the cavity of the mold.

The advantages include obtaining a substantially continuous backing across the electro-formed layer and having good compression strength because each of the individual rods is a solid piece of material and will give excellent backing. If the solder leaves some voids or shrinks slightly this does not lessen the backing properties of the rods. The voids will usually occur as very small voids and be spaced in the areas between the rods. The portions of the backing adjacent the irregular contours of the mold shell or electro-formed layer will remain in contact with this layer and provide a solid support for it during use.

Objects of the invention

It is an object of the present invention to present a mold which has a cavity or plunger formed from a shell made by depositing a layer onto a model of the part which is to be ultimately molded.

It is a further object of the present invention to present a mold which has a cavity or plunger formed from a shell made by depositing a layer onto a model of the part to be molded and which is backed in a manner that prevents irregularities, voids or shrinkage in the backing material.

It is a further object of the present invention to present a mold having a cavity or plunger formed from a shell made by depositing a layer over a model of the part to be molded wherein the layer is mounted in a large block of steel or other material and is backed with material having similar thermal expansion properties.

It is a still further object of the present invention to present a mold formed by depositing a layer of material onto a model of the part to be molded and which has backing material held together by a low melting point solder to eliminate problems caused by thermal stresses induced by high temperatures.

It is a still further object of the present invention to present a method of making a mold using a deposited layer formed over a model of the part to be molded.

Other objects are inherent in the specification and will become apparent as the description proceeds.

In the drawings,

FIG. 3 is a sectional view of the device of FIG. 2 showing backing rods in place against the mold shell and showing material being added to fill the interstitial spaces between the rods and maintain them in fixed position;

FIG. 5 is a sectional view of a mold plunger shell being formed by depositing a layer over a model of a part that will be molded.

Detailed description of the invention

Figure 1:
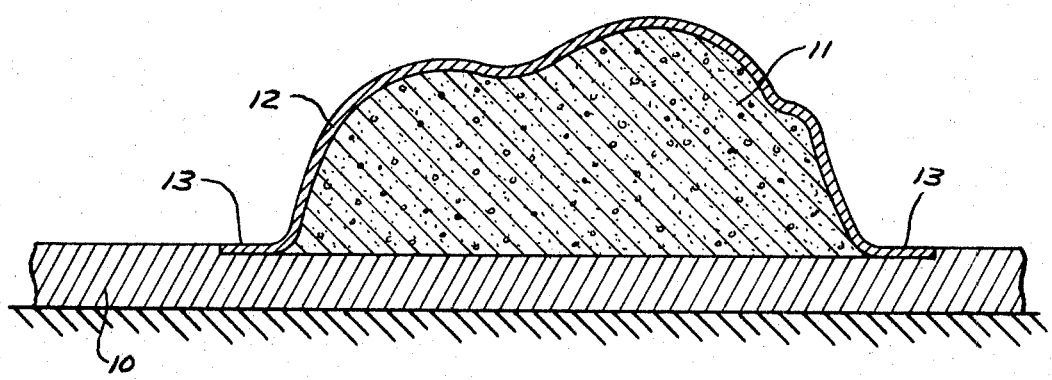
FIG. 1 is a sectional view in schematic form showing a model of the part to be employed having a layer of nickel or other similar material deposited thereover to form a shell for a mold cavity.

Referring to the drawings and the numerals of reference thereon, in FIG. 1 there is shown schematically a support member 10 which is inside a plating bath (which is not shown) or other device for depositing a layer of metal onto objects. As shown, the support member 10 is used to support a model 11 of a part to be molded. The model 11 has an irregular outer contour, and of course has longitudinal length as shown. The model is sectioned along a desired line of the part. The model 11 is held onto the support in a suitable manner, and a layer 12 of material is deposited over the model, and also adjacent the edges of the model to form flanges 13 around the periphery of the model 11. The layer 12 then actually forms a shell having the proper contour for the cavity of a mold. The parts are separated, and the layer 12 is the negative of the model 11 and is formed exactly to the contours of the model. The thickness of the layer 12 can vary. In electro depositing of nickel, which has been found to be suitable, the layer can be built up to a thickness of about one quarter inch without any difficulty. Other forms of depositing material onto the model can be used, for example, vacuum depositing or metal spraying.

The layer 12 will be termed the mold shell for the purposes of this description. It actually forms the inner surfaces of the mold cavity, against which the parts are molded.

The mold shell 12 is then removed from the model 11 and is placed into a block 14 of steel which wil form part of the mold shell backing. As shown, the block 14 has a large center opening 15 defined therethrough and this opening is of size so that it will fit around the raised portions of the mold shell 12 and so that the edges defining the opening will engage the flanges 13 all around the edge of the mold shell. The opening 15 can be cut out very quickly from a large block of steel.

The flanges 13 of the mold shell 12 are then fastened to the block 14 of steel adjacent the opening 15 with suitable means, for example, screws 16. This will hold the mold shell in position within the opening and prevent it from shifting. The shell can be used as it comes from the plating or depositing bath. Any "trees" or great irregularities on the back of the shell should be removed.

After this, referring to FIG. 3, the opening 15 is filled with a plurality of rods 20 which are stacked parallel to each other and with their axes parallel and extending in the direction of force on the mold. The rods 20 can be either round, hexagon, square or other cross-sectional shapes. The rods are packed as tightly as possible into the opening 15 so that they are nearly contiguous.

The rods are such that when one size round steel rods are used, about 90 percent of the volume in opening 15 is filled with the rods themselves and this can approach 100 percent for hexagon or square cross-section rods.

The rods are made of a steel which has substantially the same coefficient of thermal expansion as the block 14. If desired, the rods can be pretinned. Such rods are available commercially and this will help in the later step of adding solder to hold the rods together and to join them to the mold shell 12.

As shown in FIG. 3, then a suitable molten solder 21 is poured into the opening 15 between the rods 20. Also suitable flux is added to aid the soldering. If desired, the rods can be staggered in length so that a pouring well 22 is formed in the center of the mold to aid in this step. The entire mold block 14 and mold shell 12 can be heated in a furnace for the soldering process.

When the solder material has cooled, the rods are fastened together as a unit and provide backing for the mold face 12. The rods are then milled or sawed off flush with the top of the block 14. The block is then placed into a press, and the mold can be used in normal manner.

Thus, the method of making the mold comprises the steps of depositing a layer of the material onto a model of the article to be molded to form a mold shell, removing the layer of material and mounting it to a backing block, then adding a plurality of elongated metallic objects oriented with the ends in engagement with the layer of material, and adding material to the interstitial spaces between the objects to cause them to adhere together and to the backing block and layer to form a uniform backing mass for the mold shell.

The use of elongated rods gives a solid backing that won't shift under high loads when solder is used to hold the rods together. The steel rods carry the load to the mold shell or die shell and the solder prevents shifting. There is a large area of contact between the solder and the rods to give strength to the assembly. If spheres or other randomly oriented objects are used in the backing, these objects will tend to shift more easily. The rods do not tend to shift because one end of each is acted on directly by the load applying device (platen or other actuator) and the other end of each rod directly contacts the mold shell. The solder (or other binder) does not have to carry bearing loads to the mold shell.

This makes it feasible to use solder which has a low melting point. A low melting point means that the mold does not have to be subjected to excessive temperatures when the rods are fastened together. This cuts down on distortion from temperature stresses to a point where they are not a problem. The die or mold remains true.

In FIGURE 5, there is shown a plunger for use with the mold cavity shown in FIGURES 1–4. The plunger is made in exactly the same manner as the previous discussed mold cavity. It is the mating part for the cavity previously described. In the use of the term mold shell, it is to be understood that this includes either the plunger and the mold cavity. In order to make the plunger, of course, the inside surface of the molded piece is used for plating on the shell material. As can be seen in FIGURE 5, a part 30, which is the part to be molded, is made in its finished form. In other words it is made to the exact shape and thickness that it is to be in the finished part. The inner surface of the part is formed to the same contour as the finished part. Then, this part 30 is backed with a suitable backing material 31 which can be an epoxy, a metal or other backing, and then a layer 32 of material is deposited over the part to make the plunger shell.

Figure 4:
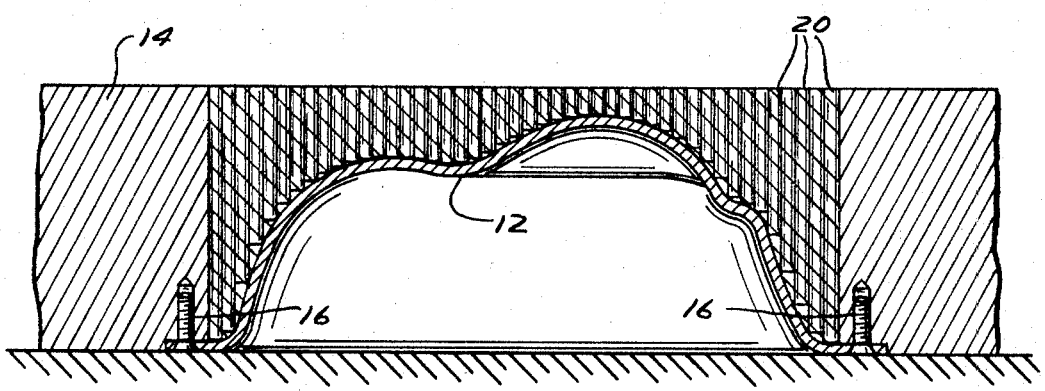
FIG. 4 is a view of the mold after it has been formed and the outwardly extending portions of the rods have been removed from the mold block.

The deposited layer 32 forming the shell is removed after it is the desired thickness and processed further in the same manner as shown in FIGURES 3 and 4. The slender objects or rods 20 are placed inside the plunger cavity to back up the plunger face. Such rods are shown in dotted lines at 33 in FIGURE 5. The plunger can be mounted on a backing block, but will have to be of size to fit within the cavity.

After this is completed, the plunger shell and the mold cavity shell are mounted as a pair and the parts are formed in a conventional manner with suitable presses.

In addition to solder 21 being used to hold the rods in place, an epoxy resin can be used for holding the slender metallic objects together. Various alloy solders can also be used.

When the block 14 or other mounting block in the case of the plunger, and the rods or slender metallic objects 20 have the same coefficient of expansion, there will be little or no thermal distortion of the mold shell. The binder material is of a minimal amount and is not sufficient to cause distortion even though it may have a different coefficient of expansion. The material in the rods and in the backing will control the expansion of the shell and of the complete mold itself so that the binder material does not cause distortion at different temperatures of operation.

Figure 2:
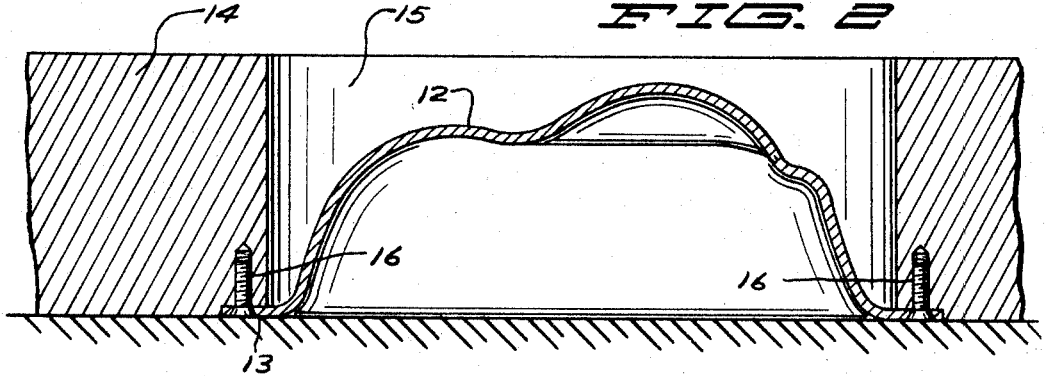
FIG. 2 is a sectional view of the shell formed over the model of the part to be molded placed into and opening in a block of backing material.

In order to facilitate first class production of the mold shells both for the plunger and for the cavity, a slightly different plating process can be utilized. Referring to FIGURE 5, a part model such as model 30 is used. In the initial process, the backing 31 would also be used. The exposed surface of the backing and part are coated with conductive silver paint. A thin layer forming an initial buildup for shell 32 is electroplated over the model and the backing. After this thin layer (on the order of 20 to 30 mils thick), which is thinner than that needed for the final mold shell 32, has been deposited, the backing 31 is removed from the part. The "inner" surface 35 of the already deposited thin layer, which was in contact with the backing and also the exposed surface 36 of the model 30 are coated with conductive silver paint. The "outer" surface of the thin layer forming the start of shell 32 is reactivated in a conventional manner so that there will be a good bond between the thin layer and additionally deposited material. Then the plating operation continues. Not only is the shell 32 further built up on its surface opposite model 30, but a separate shell forming the mold cavity is deposited on the surface 36 of model 30 and surface 35 against which the previous backing was resting. This additional shell is shown by dotted lines 37 superimposed on the backing 31. Depositing the silver paint along surface 36 and surface 35 prior to the additional plating prevents the newly deposited layer from sticking to the previously deposited layer forming the first portion of shell 32 and also from sticking to the model. If the layer 37 sticks to shell 32 the mold shells couldn't be separated. This is the parting line of the mold shells. Then, after the shell 32 and the new layer or shell 37, which forms the cavity for the part 30, have been built up to a desired thickness, the plating operation is stopped and the assembly removed from the plating bath. The shell 32 is removed from the part 30 and the layer or shell 37 forming the mold cavity is removed from the opposite side of the part. This makes both the cavity and the plunger of the mold in one plating bath. The mold cavity shell is then backed as shown in FIGURES 2–4 and the mold plunger shell is also backed as previously described. This operation simplifies the forming of the cavity shell and plunger shell to get exactly mating parts for the two mold parts.

This specific coating operation gives great advantage both in economizing time and insuring that the fit will be exact.

Other means can be used for forming the shell if desired. Thin metallic, explosively formed parts can be used for the mold shells and plungers and, too, the shell can be built by actually manually smearing on layers of suitable material over the models or parts on which the shell is being formed.

What is claimed is:

1. A mold comprising a thin mold shell, backing means for the shell comprising a plurality of slender generally elongated objects having longitudinal axes oriented in direction of pressure on said mold shell during operation, and means between said elongated objects forming a permanent bond to secure said slender elongated objects to each other and to the mold shell.

2. The combination as specified in claim 1 and a support member having an opening therethrough, said mold shell extending into said opening and engaging said support member.

3. The combination as specified in claim 2 wherein the elongated objects are soldered together and to the support member.

4. The combination as specified in claim 2 wherein the elongated objects are fitted within the opening defined in the support member and wherein the support member and elongated objects have substantially the same coefficient of thermal expansion.

5. The combination as specified in claim 2 wherein the elongated objects are steel rods, the support member is made of steel, and the means forming a permanent bond comprises solder.

6. The combination as specified in claim 5 wherein the mold shell is made of nickel.

7. The combination as specified in claim 1 wherein the slender objects comprise metallic rods placed closely adjacent each other.

8. The combination as specified in claim 1 wherein the mold shell comprises a thin layer of material conforming generally to the contour of the object to be molded, and wherein said means forming a permanent bond is in a liquid state prior to forming the permanent bond.

9. The combination as specified in claim 1 wherein the elongated objects comprise metal rods, each rod directly backing portions of said mold shell at least partially contacting the mold shell.

References Cited

UNITED STATES PATENTS 2,613,397 10/1952 Borkland.
2,881,486 4/1959 Soref.
3,171,163 3/1965 Ford et al.

J. SPENCER OVERHOLSER, *Primary Examiner.*

DE WALDEN W. JONES, *Assistant Examiner.*